No. 771,080. Patented September 27, 1904.

UNITED STATES PATENT OFFICE.

RICHARD LIEBOLD, OF WEIMAR, GERMANY.

MANUFACTURE OF ACID-PROOF AND IMPERMEABLE CEMENT.

SPECIFICATION forming part of Letters Patent No. 771,080, dated September 27, 1904.

Application filed May 19, 1904. Serial No. 208,748. (No specimens.)

*To all whom it may concern:*

Be it known that I, RICHARD LIEBOLD, merchant, a subject of the Grand Duke of Saxe-Weimar, residing at Weimar, in the Grand Duchy of Saxe-Weimar, German Empire, have invented certain new and useful Improvements in the Manufacture of Acid-Proof and Impermeable Cements, of which the following is a specification.

My invention relates to improvements in the manufacture of acid-proof and impermeable cements.

To add to ground Portland cement soda, potash, or gypsum for the purpose of accelerating or retarding, as the case may be, the process of binding the cement and to cause it to retain for a longer time the water necessary for the hardening of the cement is equally as well known as the impregnating of cement blocks with paraffin, wax, colophony, or stearin to make them impermeable and to prevent the sweating of the stone.

The commonly-used unimpregnated cements have generally a tendency to destroy the color of stones manufactured from such cements. To avoid this and at the same time to manufacture a cement which for any length of time is acid-proof and impermeable is the purpose of my invention. To this end I proceed as follows: To every one hundred kilograms of ready-burnt but not ground cement I add a mixture of three hundred grams of Japan vegetable or berry wax and twenty grams of caustic lime dissolved in eight liters of boiling water and thoroughly mix the same. After the so-mixed cement is cooled down the same is dried and finely ground. After the cement has passed through the various well-known manipulations it is ready for use. Many trials have demonstrated that cement so prepared is perfectly impermeable and acid-proof and is therefore specially adapted to be used for all building purposes and for the manufacture of cement blocks. Colored cement blocks so prepared do not loose their color.

Having now particularly described the nature of my invention, what I claim is—

1. A process of making acid-proof and impermeable cements, which consists in adding to ready-burnt but not ground cement a mixture of wax and caustic lime dissolved in boiling water, and then grinding the same.

2. A process for making acid-proof and impermeable cements, which consists in adding to every one hundred kilograms of ready-burnt but not ground cement a mixture of three hundred grams of Japan vegetable or berry wax, and twenty grams of caustic lime dissolved in eight liters of boiling water, and then grinding the same.

In testimony whereof I have hereunto set my hand in presence of two subscribing witnesses.

RICHARD LIEBOLD.

Witnesses:
 PAUL TRICHMANN,
 FRITZ SCHNELL.